United States Patent
Teramoto et al.

(10) Patent No.: US 6,924,331 B2
(45) Date of Patent: Aug. 2, 2005

(54) FLAME-RETARDANT POLYOLEFIN RESIN COMPOSITION

(75) Inventors: Makoto Teramoto, Kyoto (JP); Hideaki Onishi, Otsu (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 86 days.

(21) Appl. No.: 10/276,704

(22) PCT Filed: Feb. 5, 2002

(86) PCT No.: PCT/JP02/00938

§ 371 (c)(1),
(2), (4) Date: Nov. 18, 2002

(87) PCT Pub. No.: WO02/074852

PCT Pub. Date: Sep. 26, 2002

(65) Prior Publication Data

US 2003/0139507 A1 Jul. 24, 2003

(30) Foreign Application Priority Data

Mar. 19, 2001 (JP) ......................... 2001-077812

(51) Int. Cl.⁷ ................... C08K 5/3492; C08K 5/41; C08K 5/06; C08K 3/22
(52) U.S. Cl. .................. 524/101; 524/167; 524/373; 524/412
(58) Field of Search .................... 524/101, 167, 524/373, 412

(56) References Cited

U.S. PATENT DOCUMENTS 5,216,059 A  6/1993  Atwell et al.

FOREIGN PATENT DOCUMENTS

| JP | 4325564 A | 11/1992 |
| JP | 07505910 A | 6/1993 |
| JP | 5320439 A | 12/1993 |
| JP | 5339470 A | 12/1993 |
| JP | 6299007 A | 10/1994 |
| JP | 6322280 A | 11/1994 |
| JP | 10316803 A | 12/1998 |

*Primary Examiner*—Tae H. Yoon
(74) *Attorney, Agent, or Firm*—Millen, White, Zelano & Branigan, P.C.

(57) ABSTRACT

A flame retarded polyolefin resin composition comprises polyolefin resin, 1 to 40 parts by weight per 100 parts of the polyolefin resin of a brominated bisphenol ether derivative of the formula:

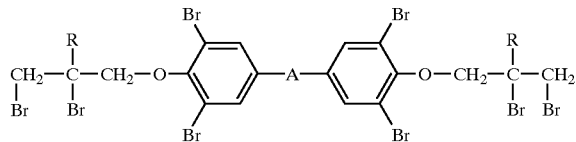

wherein R is hydrogen or methyl, and A is $-C(CH_3)_2-$, $-SO_2-$, $-S-$, or $-CH_2-$; and 1 to 30 parts by weight per 100 parts of the polyolefin resin of 2,4,6-tris(mono-, di- or tribromophenoxy)triazine.

9 Claims, No Drawings

FLAME-RETARDANT POLYOLEFIN RESIN COMPOSITION

FIELD OF THE INVENTION

This invention relates to a flame retarded polyolefin resin composition. Particularly, it relates to a flame retarded polyolefin resin composition which is less susceptible to bleeding and blooming by flame retardants incorporated therein.

BACKGROUND PRIOR ART

Polyolefin resins such as polyethylene or polypropylene have many of desirable properties for fabricating various articles and parts such as containers, mechanical parts, electric and eletronic parts, automobile parts and the like. These properties include, among others, high resistance to water and chemicals, electrical insulation property, high mechanical strength and high processability for fabrication. Polyolefins consist solely of carbon and hydrogen atoms and, therefore, inflammable. For use in a field of application that requires flame retardancy, a flame retardant is incorporated into the polyolefin resin.

Conventionally bromine-containing flame retardants have been used for this purpose. Most of such flame retardants, however, are not well compatible with the resin and tend to migrate to the surfaces of fabricated parts known as "bleeding" when incorporated in an amount sufficient to impart with a desired level of flame retardancy such as V-O of UL-94 standard. When migrated flame retardants deposit on the surfaces of parts as off-white crystals or powders, they are called "blooming".

Bleeding and blooming are deleterious not only to the appearance of parts but also to the performance of devices and instruments in which such parts have been mounted.

Several attempts have been made to prevent bleeding and blooming. JP-A-04285647 discloses a flame retarded polypropylene composition including 2,2-bis[4-(2,3-dibromopropoxy)-3,5-dibromophenyl] propane and a benzylidene derivative of sorbitol or xylitol. JP-A-10182889 discloses a flame retarded polyolefin composition including a halogen-containing flame retardant and a polymer containing aromatic hydrocarbon monomer such as styrene. Because such substances are free of bromine, the bromine content and, therefore, the degree of flame retardancy of the entire flame retarded composition must be compromised when they are added in an effective amount to prevent bleeding and blooming satisfactorily. Co-addition of the benzylidene derivative of sorbitol and xylitol suffers from another problem of deposition or sticking on the inner surfaces of injection molds.

SUMMARY OF THE INVENTION

The present invention provides a flame retarded resin composition comprising (A) a polyolefin resin; (B) 1 to 40 parts by weight per 100 parts of (A) of a brominated bisphenol derivative of the formula:

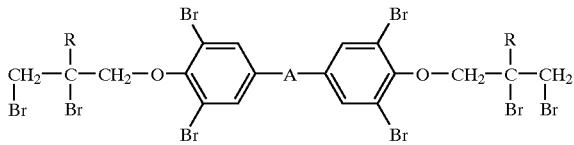

wherein R is hydrogen or methyl, and A is —C(CH$_3$)$_2$—, —SO$_2$—, —S— or —CH$_2$—; and (C) 1 to 30 parts by weight per 100 parts of (A) of 2,4,6-tris(mono-, di- or tribromophenoxy) triazine.

The above components (B) and (C) themselves are a bromine-containing flame retardant. When either of them is incorporated alone into the polyolefin resin to achieve a desired level of flame retardancy, it tends to cause bleeding or blooming. Surprisingly, it was found that combined use of components (B) and (C) in amounts sufficient to achieve a desired level of flame retardancy does not develop bleeding and blooming in articles fabricated from polyolefin resin containing the same.

PREFERRED EMBODIMENTS OF THE INVETNION (A) Polyolefin Resins:

The term "polyolefin resins" as used herein refers to homo- or copolymers of an aliphatic unsaturated hydrocarbon monomer such as ethylene, propylene, butene, pentene, isoprene or butadiene. Typical examples thereof include polypropylene, polyethylene and ethylene-propylene copolymer. Polypropylene and high density polyethylene are of particular interest.

(B) Brominated Bisphenol Derivatives:

Specific compounds of the above formula include the following.

2,2-bis[4-(2,3-dibromopropoxy)-3,5-dibromophenyl] propane;

2,2-bis[4-(2,3-dibromo-2-methylpropoxy)-3,5-dibromophenyl]propane;

Bis[4-(2,3-dibromopropoxy)-3,5-dibromophenyl] sulfone;

Bis [4-(2,3-dibromo-2-methylpropoxy)-3,5-dibromophenyl]sulfone;

Bis[4-(2,3-dibromopropoxy)-3,5-dibromophenyl]sulfide;

Bis[4-(2,3-dibromo-2-methylpropoxy)-3,5-dibromophenyl]sulfide;

Bis[4-(2,3-dibromopropoxy)-3,5-dibromophenyl] methane; and

Bis[4-(2,3-dibromo-2-methylpropoxy)-3,5-dibromophenyl]methane.

Mixture of the above compounds may also be employed. Some of them are commercially available and others may be synthesized by etherifying a corresponding tetrabromobisphenol with allyl chloride or methallyl chloride followed by addition of bromine to the allyl or methallyl double bond of the resulting allyl ether.

(C) Tris(bromophenoxy)triazines:

2,4,6-Triphenoxytriazines having up to three bromo substituents on each phenoxy group may be employed. They are synthesized by reacting cyanuric chloride with mono-, di- or tribromophenol. 2,4,6-Tris(2,4,6-tribromophenoxy)triazine, 2,4,6-Tris(2,6-dibromophenoxy)triazine or a mixture thereof is preferable.

Proportions of components (B) and (C) per 100 parts by weight of polyolefin resin (A) are 1 to 40 parts by weight and 1 to 30 parts by weight, respectively. The flame retardancy levels depend on the combined proportions of components (B) and (C) in the composition while it is necessary for them to be present in the composition in a certain range of ratio in order to prevent bleeding and blooming. The proportions of components (B) and (C), however, should not be excessive provided that a desired level of flame retardancy is achieved because they have adverse effect on the mechanical strength of articles fabricated from the composition. Taking these factors into consideration, preferable proportions of components (B) and (C) per 100 parts of polyolefin resin (A) are 3 to 25 parts by weight and 5 to 20 parts by weight, respectively.

The flame retarded polyolefin resin composition of the present invention may optionally comprise additives other than components (B) and (C). For example, antimony trioxide is known to enhance the flame retardancy of halogen-containing flame retardants. The composition of the present invention may also comprise antimony trioxide or other auxiliary flame retardants. When used, the amount of antimony trioxide is preferably 0.1 to 1.0 times by weight of the combined weights of component (B) and (C).

Addition of a brominated epoxy resin is effective to eliminate or decrease percent bleeding when compared at the same level of addition of components (B) and (C). The brominated epoxy resin is also effective as a heat stabilizer during fabrication step of the composition. When used, the amount of brominated epoxy resin should be less than 20 parts by weight, preferably 1 to 15 parts by weight per 100 parts by weight of polyolefin resin (A).

Copolymers of olefin and a polar group-containing vinyl monomer such as ethylene-(meth)acrylic acid copolymer, ethylene-alkyl(meth)acrylate copolymer or ethylene-vinyl acetate copolymer, and copolymers, block Copolymers in particular, of olefin and an aromatic hydrocarbon monomer such as ethylene-styrene copolymer, ethylene-propylene-styrene copolymer, isoprene-styrene copolymer, ethylene-isoprene-styrene copolymer or hydrogenated butadiene-styrene copolymer are also effective to decrease percent bleeding when compared at the same level of addition of components (B) and (C). These copolymers, however, may affect the flame retardancy because they are free of bromine content. They also affect the strength properties of fabricated articles. Accordingly, the amount of these copolymers, when used, should be less than 50 parts by weight, preferably 3 to 30 parts by weight per 100 parts by weight of polyolefin resin (A).

Similarly, halogenated polyolefins such as chlorinated polyethylene or chlorinated polypropylenes are also effective to decrease percent bleeding when used less than 50 parts by weight, preferably 3 to 30 parts by weight per 100 parts by weight of polyolefin resin (A).

The flame retarded polyolefin resin composition of the invention may comprise a variety of conventional additives for polyolefin resin such as antioxidants, heat stabilizers, UV absorbers, UV stabilizers, pigments, fillers, lubricants, antidripping agents, nucleating agents or antistatic agents. Small proportions of known flame retardants other than components (B) and (C) may also be added.

The flame retarded polyolefin resin composition of the present invention may be produced by the conventional process such as by mixing the resin and various additives and milling the mixture under heat to obtain a homogenous compound using a machine such as twin screw extruders, Bunbary mixer or hot rolls. Some additives may be premixed and then added to the resin together with the remaining additives. The resulting compound may be shaped to a desired article by injection molding, hot pressing and other shaping methods.

EXAMPLES

The following examples are intended to further illustrate the present invention without limiting thereto. All parts and percents therein are by weight unless otherwise indicated.

I. Materials

The following materials are used in Examples and Comparative Examples.

(A) Polyolefin Resin

A-1. Polypropylene available from Tokuyama Corp. under the name of TOKUYAMA POLYPRO ME 230.

A-2. High density polyethylene available from Nippon Polychem Co., Ltd. under the name of NOVATEC HD HJ 360.

(B) Component

B-1: 2,2-Bis[4-(2,3-dibromopropoxy)-3,5-dibromophenyl]propane available from Dai-Ichi Kogyo Seiyaku Co., Ltd. under the name of PYROGUARD SR-720.

B-2. Bis[4-(2,3-dibromopropoxy)-3,5-dibromophenyl] sulfone available from Marubishi Yuka Co., Ltd. under the name of NONNEN PR-2.

(C) Component

C-1. Tris(2,4,6-tribromophenoxy)triazine available from Dai-Ichi Kogyo Seiyaku Co., Ltd. under the name of PYROGUARD SR-245.

C-2. Tris(2,6-dibromophenoxy)triazine.

(D) Brominated Epoxy Resin

D-1. Tetrabromobisphenol A epoxy resin oligomer available from Tohto Kasei Co., Ltd. under the name of TB-60.

D-2. Tetrabromobisphenl A epoxy resin oligomer available from Tohto kasei Co., Ltd. under the name of YDB-409.

(E) Olefin Copolymer

E-1. Ethylene-ethyl acrylate copolymer, (ethyl acrylate 0.10%) available from Nippon Unicar Co., Ltd. under the name of NUC-6221.

E-2. Ethylene-vinyl acetate copolymer (vinyl acetate 4.5%) available from Sumitomo Chemical Co., Ltd. under the name of EVATATE D4040.

E-3. Ethylene-propylene-styrene copolymer (styrene 13%) available from Kuraray Co., Ltd. under the name of SEPTON 2043.

(F) Halogenated Polyolefin

Chlorinated polyethylene (chlorine content 30 wt. %) available from Daiso Co., Ltd. under the name of DAISO-LAC U303.

(G) Auxiliary Flame Retardant

Antomony trioxide available from Dai-Ichi Kogyo Seiyaku Co., Ltd. under the name of PYROGUARD AN-800(T).

(H) Antioxidant available from Ciba Specialty Chemicals under the name of IRGANOX B225.

(I) Carbon black master batch (carbon black 50%) available from Tohwa Chemical Co., Ltd. under the name of DB 4008.

(J) Hexabromocyclododecane available from Dai-Ichi Kogyo Seiyaku Co., Ltd. under the name of PYROGUARD SR-105.

II. Test Method

1. Fabrication of Specimens

All materials were milled on hot rolls at 190° C. for 15 minutes and then molded into a sheet by compressing the resulting compound at 200° C. for 3 minutes using a hot press. Specimens were cut out from the sheet in predetermined sizes. Carbon black PP Master batch was incorporated into the composition to impart the specimen with black color so that any bleeding can be observed visually.

2. Flame Retardancy Test

The vertical flaming test according to UL-94 standard was followed using a specimen having 127 mm length, 12.7 mm width and 1.6 mm thickness.

3. Bleeding Test

A specimen of 70×50×3.2 mm size was aged at 80° C. for one week. The degree of bleeding was visually observed after aging and judged according to the following criteria.

N: Not observed; S: Slightly observes; W: Whitened

Percent bleeding was determined by wiping the specimen with acetone, measuring the initial weight of specimen (Wi), aging the speciment at 80° C. for one week, wiping the aged speciment with acetone and measuring the weight of aged specimen (Wx). Percent bleeding is calculated by the following equation.

% Bleeding=(Wi−Wx)/(flame retardant contents)×100

The degree of blooming was determined by measuring the color difference ΔE before and after wiping the aged specimen with acetone using a, spectro-colormeter Model ZE-3000 sold by Nippon Denshoku Co., Ltd. and judged according to the following criteria.

None=ΔE≦5.0;Yes:ΔE>5.0

Examples 1–12 and Comparative Examples 1–2

Specimens were made from the flame retarded resin compositions shown in Table 1 and tested for flame retardancy and bleeding. The results obtained are also shown in Table 2.

TABLE 1

| (parts by weight) | EXAMPLE | | | | | |
|---|---|---|---|---|---|---|
| | 1 | 2 | 3 | 4 | 5 | 6 |
| (A) Polyolefin | | | | | | |
| A-1 | 100 | — | 100 | 100 | 100 | 100 |
| A-2 | — | 100 | — | — | — | — |
| (B) Flame retardant | | | | | | |
| B-1 | 10 | — | 10 | 10 | 11 | 11 |
| B-2 | — | 10 | — | — | — | — |
| (C) Flame retardant | | | | | | |
| C-1 | 4 | 4 | — | 4 | 5 | 5 |
| C-2 | — | — | 4 | — | — | — |
| (D) Brominated epoxy resin | | | | | | |
| D-1 | — | — | 4 | — | — | — |
| D-2 | — | — | — | 4 | — | — |
| (E) Olefin copolymer | | | | | | |
| E-1 | — | — | — | — | 11 | — |
| E-2 | — | — | — | — | — | 11 |
| E-3 | — | — | — | — | — | — |
| (G) Antimony trioxide | 6 | 6 | 7 | 7 | 7 | 7 |
| (H) Antioxidant | 0.4 | 0.4 | 0.4 | 0.4 | 0.4 | 0.4 |
| (I) Carbon black master batch | 5 | 5 | 5 | 5 | 5 | 5 |

| (parts by weight) | EXAMPLE | | | | | |
|---|---|---|---|---|---|---|
| | 7 | 8 | 9 | 10 | 11 | 12 |
| (A) Polyolefin | | | | | | |
| A-1 | 100 | 100 | 100 | 100 | 100 | 100 |
| A-2 | — | — | — | — | — | — |
| (B) Flame retardant | | | | | | |
| B-1 | 11 | 20 | 11 | 9 | 7 | 11 |
| B-2 | — | — | — | — | 4 | — |
| (C) Flame retardant | | | | | | |
| C-1 | 5 | 5 | 20 | 3 | 5 | 5 |
| C-2 | — | — | — | — | — | — |
| (E) Olefin copolymer | | | | | | |
| E-1 | — | 11 | 11 | — | — | — |
| E-3 | 11 | — | — | — | — | — |
| (F) Halogenated polyolefin | — | — | — | — | — | 11 |
| (G) Antimony trioxide | 7 | 7 | 7 | 7 | 6 | 7 |
| (H) Antioxidant | 0.4 | 0.4 | 0.4 | 0.4 | 0.4 | 0.4 |
| (I) Carbon black master batch | 5 | 5 | 5 | 5 | 5 | 5 |
| (J) Hexabromocyclododecane | — | — | — | 1 | — | — |

TABLE 1-continued

| Material (parts by weight) | Comp. Example | |
|---|---|---|
| | 1 | 2 |
| (A) Polyolefin A-1 | 100 | 100 |
| (B) Flame retardant B-1 | 14 | — |
| (C) Flame retardant C-1 | — | 35 |
| (G) Antimony trioxide | 6 | 15 |
| (H) Antioxidant | 0.4 | 0.4 |
| (I) Carbon black master batch | 5 | 5 |

TABLE 2

| | EXAMPLE | | | | | | |
|---|---|---|---|---|---|---|---|
| Item | 1 | 2 | 3 | 4 | 5 | 6 | 7 |
| Flame retardancy (UL-94) | V-0 | V-0 | V-0 | V-0 | V-0 | V-0 | V-0 |
| Bleeding: | | | | | | | |
| Visual | N | N | N | N | N | N | N |
| % Bleeding | 1.9 | 1.8 | 1.7 | 1.7 | 1.4 | 0.9 | 1.3 |
| Blooming | None | None | None | None | None | None | None |

| | EXAMPLE | | | | |
|---|---|---|---|---|---|
| Item | 8 | 9 | 10 | 11 | 12 |
| Flame retardancy (UL-94) | V-0 | V-0 | V-0 | V-0 | V-0 |
| Bleeding: | | | | | |
| Visual | N | N | N | N | N |
| % Bleeding | 2.2 | 1.6 | 1.8 | 1.5 | 1.4 |
| Blooming | None | None | None | None | None |

| | Comp. EXAMPLE | |
|---|---|---|
| Item | 1 | 2 |
| Flame retardancy (UL-94) | V-0 | V-2 |
| Bleeding: | | |
| Visual | W | S |
| % Bleeding | 10.0 | 4.3 |
| Blooming | Yes | Yes |

The above results demonstrate the effect of combined use of components (B) and (C) for preventing bleeding and blooming in flame retarded polyolefin resin compositions.

What is claimed is:

1. A flame retarded polyolefin resin composition comprising:

(A) a polyolefin resin;
(B) 1 to 40 parts by weight per 100 parts of said polyolefin resin of a brominated bisphenol ether derivative of the formula:

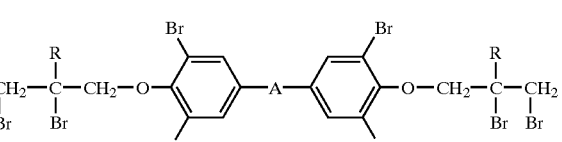

wherein R is hydrogen or methyl, and A is —C(CH$_3$)$_2$—, —SO$_2$—, —S—, or —CH$_2$—; and (C) 1 to 30 parts by weight per 100 parts of said polyolefin resin of 2,4,6-tris(mono-, di-, or tribromophenoxy) triazine.

2. The flame retarded polyolefin resin composition of claim 1 further comprising up to 20 parts by weight per 100 parts of said polyolefin resin of a brominated epoxy resin.

3. The flame retarded polyolefin resin composition of claim 2 wherein said brominated epoxy resin is an oligomer of tetrabromobisphenol A epoxy resin.

4. The flame retarded polyolefin resin composition of claim 1 further comprising up to 50 parts by weight per 100 parts of said polyolefin resin of a copolymer of olefin and a polar group-containing vinyl monomer or a copolymer of olefin and an aromatic hydrocarbon monomer or a halogenated polyolefin.

5. The flame retarded polyolefin resin composition of claim 1 further comprising an auxiliary flame retardant in an amount 0.1 to 1.0 times of the combined weights of (B) and (C).

6. The flame retarded polyolefin resin composition of claim 5 wherein said auxiliary flame retardant is antimony trioxide.

7. The flame retarded polyolefin resin composition of any of claim 1 wherein (B) and (C) are present in amounts of 3 to 25 parts by weight and 5 to 20 parts by weight, respectively per 100 parts of said polyolefin resin.

8. The flame retarded polylefin resin composition of claim 1 wherein (B) is present in an amount of 3 to 25 parts by weight per 100 parts of said polylefin resin.

9. The flame retarded polylefin resing composition of claim 1 wherein (C) is present in an amount of 5 to 20 parts by weight per 100 parts of said polylefin resin.

* * * * *